US008440931B2

(12) United States Patent
Nakano et al.

(10) Patent No.: US 8,440,931 B2
(45) Date of Patent: May 14, 2013

(54) ELECTRODE FOR ELECTRICAL-DISCHARGE SURFACE TREATMENT AND METHOD OF MANUFACTURING THE SAME

(75) Inventors: Yoshikazu Nakano, Tokyo (JP); Takeshi Araki, Tokyo (JP); Takako Takei, Tokyo (JP); Kazuki Kubo, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1006 days.

(21) Appl. No.: 12/518,902

(22) PCT Filed: Dec. 27, 2006

(86) PCT No.: PCT/JP2006/326122
§ 371 (c)(1),
(2), (4) Date: Jun. 12, 2009

(87) PCT Pub. No.: WO2008/081520
PCT Pub. Date: Jul. 10, 2008

(65) Prior Publication Data

US 2010/0000974 A1 Jan. 7, 2010

(51) Int. Cl.
*B23H 7/14* (2006.01)
*B23K 9/00* (2006.01)

(52) U.S. Cl.
USPC .................................... 219/69.15; 219/69.1

(58) Field of Classification Search ............... 219/69.15, 219/69.17, 69.11, 69.1
See application file for complete search history.

(56) References Cited

U.S. PATENT DOCUMENTS

| | | | | |
|---|---|---|---|---|
| 4,373,127 | A * | 2/1983 | Haskett et al. | 219/69.15 |
| 4,469,654 | A * | 9/1984 | Haskett et al. | 264/618 |
| 5,108,555 | A * | 4/1992 | Nishimuro et al. | 205/184 |
| 5,818,005 | A * | 10/1998 | Pratt et al. | 219/69.15 |
| 6,057,056 | A * | 5/2000 | Kim et al. | 429/213 |
| 6,225,589 | B1 * | 5/2001 | Bartok | 219/69.15 |
| 6,596,440 | B2 * | 7/2003 | Gavelin et al. | 429/306 |
| 2004/0018430 | A1 | 1/2004 | Holman et al. | |
| 2006/0021868 | A1 | 2/2006 | Goto et al. | |
| 2006/0065546 | A1 * | 3/2006 | Curodeau | 205/640 |

FOREIGN PATENT DOCUMENTS

| | | |
|---|---|---|
| DE | 956 161 | 1/1957 |
| JP | 7 197275 | 8/1995 |
| JP | 2000 153392 | 6/2000 |
| JP | 2005 213557 | 8/2005 |
| JP | 2007 70712 | 3/2007 |
| WO | 01 23641 | 4/2001 |

OTHER PUBLICATIONS

German Office Action issued Jul. 27, 2011, in Patent Application No. 11 2006 004 188.6 (with English-language translation).

* cited by examiner

*Primary Examiner* — Sang Paik
(74) *Attorney, Agent, or Firm* — Oblon, Spivak, McClelland, Maier & Neustadt, L.L.P.

(57) ABSTRACT

A method of manufacturing an electrode for electrical-discharge surface treatment includes kneading a first electrode material composed of at least one of metal powder and insulating powder and a second electrode material composed of conductive organic bonding agent in which a conductive resin is dissolved or dispersed in a solvent, to fabricate a slurry; molding the slurry, to form a compact; and desiccating the compact at a temperature below a thermal decomposition initiating temperature at which a thermal decomposition of the conductive organic bonding agent starts.

11 Claims, 13 Drawing Sheets

FIG.3-2

| AMOUNT OF SOLVENT (wt%) | SPECIFIC RESISTANCE (Ω·cm) |
|---|---|
| 0.5 | 530000 |
| 1 | 22100 |
| 2.1 | 82 |
| 15.7 | 36 |
| 20.1 | 19 |
| 24.6 | 18 |
| 30.6 | 15 |
| 35.1 | 16 |
| 39.5 | 19 |
| 46.5 | 25 |
| 49.2 | 45 |
| 50.3 | 120 |
| 52.3 | 8650 |
| 54.6 | 13500 |

FIG.7-1

| | LIQUID-STATE CONDUCTIVE BONDING AGENT | AMOUNT OF SOLVENT (wt%) | SPECIFIC RESISTANCE OF ELECTRODE FOR ELECTRICAL-DISCHARGE SURFACE TREATMENT (Ω·cm) |
|---|---|---|---|
| EMBODIMENT EXAMPLE 2-1 | POLYANILINE | 2 | 4.49E+03 |
| EMBODIMENT EXAMPLE 2-2 | POLYANILINE | 30 | 6.61E+02 |
| EMBODIMENT EXAMPLE 2-3 | POLYANILINE | 50 | 3.02E+03 |
| COMPARISON EXAMPLE 2-1 | POLYANILINE | 0.5 | 7.02E+06 |
| COMPARISON EXAMPLE 2-2 | POLYANILINE | 60 | 6.30E+06 |

FIG.7-2

| | LIQUID-STATE CONDUCTIVE BONDING AGENT | AMOUNT OF SOLVENT (wt%) | SPECIFIC RESISTANCE OF ELECTRODE FOR ELECTRICAL-DISCHARGE SURFACE TREATMENT (Ω·cm) |
|---|---|---|---|
| EMBODIMENT EXAMPLE 2-4 | POLYPYRROLE | 2 | 1.15E+04 |
| EMBODIMENT EXAMPLE 2-5 | POLYPYRROLE | 30 | 6.55E+03 |
| EMBODIMENT EXAMPLE 2-6 | POLYPYRROLE | 50 | 9.17E+03 |
| COMPARISON EXAMPLE 2-3 | POLYPYRROLE | 0.5 | 8.24E+06 |
| COMPARISON EXAMPLE 2-4 | POLYPYRROLE | 60 | 7.60E+06 |

FIG.8-1

| | LIQUID-STATE CONDUCTIVE BONDING AGENT | POLAR SOLVENT TO BE ADDED | ADDITIVE AMOUNT (wt%) | AMOUNT OF SOLVENT (wt%) | SPECIFIC RESISTANCE OF ELECTRODE FOR ELECTRICAL-DISCHARGE SURFACE TREATMENT (Ω·cm) |
|---|---|---|---|---|---|
| EMBODIMENT EXAMPLE 3-1 | POLYTHIOPHEN | ETHYLENE GLYCOL | 1 | 20 | 4.60E-01 |
| EMBODIMENT EXAMPLE 3-2 | POLYTHIOPHEN | ETHYLENE GLYCOL | 5 | 20 | 1.20E-01 |
| EMBODIMENT EXAMPLE 3-3 | POLYTHIOPHEN | ETHYLENE GLYCOL | 10 | 20 | 8.00E-02 |
| COMPARISON EXAMPLE 3-1 | POLYTHIOPHEN | ETHYLENE GLYCOL | 0 | 20 | 1.31E+01 |
| EMBODIMENT EXAMPLE 3-4 | POLYTHIOPHEN | DIMETHYLSULFOXIDE | 1 | 20 | 7.58E-01 |
| EMBODIMENT EXAMPLE 3-5 | POLYTHIOPHEN | DIMETHYLSULFOXIDE | 5 | 20 | 3.50E-01 |
| EMBODIMENT EXAMPLE 3-6 | POLYTHIOPHEN | DIMETHYLSULFOXIDE | 10 | 20 | 2.50E-01 |
| COMPARISON EXAMPLE 3-2 | POLYTHIOPHEN | DIMETHYLSULFOXIDE | 0 | 20 | 1.31E+01 |
| EMBODIMENT EXAMPLE 3-7 | POLYTHIOPHEN | DIMETHYLACETAMIDE | 1 | 20 | 9.60E-01 |
| EMBODIMENT EXAMPLE 3-8 | POLYTHIOPHEN | DIMETHYLACETAMIDE | 5 | 20 | 6.80E-01 |
| EMBODIMENT EXAMPLE 3-9 | POLYTHIOPHEN | DIMETHYLACETAMIDE | 10 | 20 | 4.26E-01 |
| COMPARISON EXAMPLE 3-3 | POLYTHIOPHEN | DIMETHYLACETAMIDE | 0 | 20 | 1.31E+01 |

FIG.8-2

| | LIQUID-STATE CONDUCTIVE BONDING AGENT | POLAR SOLVENT TO BE ADDED | ADDITIVE AMOUNT (wt%) | AMOUNT OF SOLVENT (wt%) | SPECIFIC RESISTANCE OF ELECTRODE FOR ELECTRICAL-DISCHARGE SURFACE TREATMENT (Ω cm) |
|---|---|---|---|---|---|
| EMBODIMENT EXAMPLE 3-10 | POLYANILINE | ETHYLENE GLYCOL | 1 | 20 | 1.24E+02 |
| EMBODIMENT EXAMPLE 3-11 | POLYANILINE | ETHYLENE GLYCOL | 5 | 20 | 5.59E+01 |
| EMBODIMENT EXAMPLE 3-12 | POLYANILINE | ETHYLENE GLYCOL | 10 | 20 | 3.24E+01 |
| COMPARISON EXAMPLE 3-4 | POLYANILINE | ETHYLENE GLYCOL | 0 | 20 | 8.13E+02 |
| EMBODIMENT EXAMPLE 3-13 | POLYANILINE | DIMETHYLSULFOXIDE | 1 | 20 | 2.43E+02 |
| EMBODIMENT EXAMPLE 3-14 | POLYANILINE | DIMETHYLSULFOXIDE | 5 | 20 | 1.56E+02 |
| EMBODIMENT EXAMPLE 3-15 | POLYANILINE | DIMETHYLSULFOXIDE | 10 | 20 | 8.62E+01 |
| COMPARISON EXAMPLE 3-5 | POLYANILINE | DIMETHYLSULFOXIDE | 0 | 20 | 8.13E+02 |
| EMBODIMENT EXAMPLE 3-16 | POLYANILINE | DIMETHYLACETAMIDE | 1 | 20 | 4.62E+02 |
| EMBODIMENT EXAMPLE 3-17 | POLYANILINE | DIMETHYLACETAMIDE | 5 | 20 | 2.18E+02 |
| EMBODIMENT EXAMPLE 3-18 | POLYANILINE | DIMETHYLACETAMIDE | 10 | 20 | 1.21E+02 |
| COMPARISON EXAMPLE 3-6 | POLYANILINE | DIMETHYLACETAMIDE | 0 | 20 | 8.13E+02 |

FIG. 8-3

| | LIQUID-STATE CONDUCTIVE BONDING AGENT | POLAR SOLVENT TO BE ADDED | ADDITIVE AMOUNT (wt%) | AMOUNT OF SOLVENT (wt%) | SPECIFIC RESISTANCE OF ELECTRODE FOR ELECTRICAL-DISCHARGE SURFACE TREATMENT (Ω·cm) |
|---|---|---|---|---|---|
| EMBODIMENT EXAMPLE 3-19 | POLYPYRROLE | ETHYLENE GLYCOL | 1 | 20 | 1.86E+02 |
| EMBODIMENT EXAMPLE 3-20 | POLYPYRROLE | ETHYLENE GLYCOL | 5 | 20 | 8.39E+01 |
| EMBODIMENT EXAMPLE 3-21 | POLYPYRROLE | ETHYLENE GLYCOL | 10 | 20 | 4.86E+01 |
| COMPARISON EXAMPLE 3-7 | POLYPYRROLE | ETHYLENE GLYCOL | 0 | 20 | 1.22E+03 |
| EMBODIMENT EXAMPLE 3-22 | POLYPYRROLE | DIMETHYLSULFOXIDE | 1 | 20 | 3.65E+02 |
| EMBODIMENT EXAMPLE 3-23 | POLYPYRROLE | DIMETHYLSULFOXIDE | 5 | 20 | 2.34E+02 |
| EMBODIMENT EXAMPLE 3-24 | POLYPYRROLE | DIMETHYLSULFOXIDE | 10 | 20 | 1.29E+02 |
| COMPARISON EXAMPLE 3-8 | POLYPYRROLE | DIMETHYLSULFOXIDE | 0 | 20 | 1.22E+03 |
| EMBODIMENT EXAMPLE 3-25 | POLYPYRROLE | DIMETHYLACETAMIDE | 1 | 20 | 6.93E+02 |
| EMBODIMENT EXAMPLE 3-26 | POLYPYRROLE | DIMETHYLACETAMIDE | 5 | 20 | 3.27E+02 |
| EMBODIMENT EXAMPLE 3-27 | POLYPYRROLE | DIMETHYLACETAMIDE | 10 | 20 | 2.32E+02 |
| COMPARISON EXAMPLE 3-9 | POLYPYRROLE | DIMETHYLACETAMIDE | 0 | 20 | 1.22E+03 |

FIG.12

| | LIQUID-STATE CONDUCTIVE BONDING AGENT | ORGANIC BONDING AGENT TO BE ADDED | ADDITIVE AMOUNT WITH RESPECT TO POWDER (wt%) | AMOUNT OF SOLVENT (wt%) | STRENGTH OF ELECTRODE FOR ELECTRICAL-DISCHARGE SURFACE TREATMENT (MPa) | SPECIFIC RESISTANCE OF ELECTRODE FOR ELECTRICAL-DISCHARGE SURFACE TREATMENT (Ω·cm) |
|---|---|---|---|---|---|---|
| EMBODIMENT EXAMPLE 5-1 | POLYTHIOPHEN | POLYVINYL ALCOHOL | 1 | 20 | 1796 | 6.03E+01 |
| EMBODIMENT EXAMPLE 5-2 | POLYTHIOPHEN | POLYVINYL ALCOHOL | 3 | 20 | 2153 | 5.98E+01 |
| EMBODIMENT EXAMPLE 5-3 | POLYTHIOPHEN | POLYVINYL ALCOHOL | 5 | 20 | 2267 | 9.93E+01 |
| EMBODIMENT EXAMPLE 5-4 | POLYTHIOPHEN | POLYVINYL ALCOHOL | 7 | 20 | 2341 | 5.21E+02 |
| EMBODIMENT EXAMPLE 5-5 | POLYTHIOPHEN | POLYVINYL ALCOHOL | 10 | 20 | 2335 | 4.21E+03 |
| COMPARISON 5-1 | POLYTHIOPHEN | POLYVINYL ALCOHOL | 0 | 20 | 1235 | 5.65E+01 |

ELECTRODE FOR ELECTRICAL-DISCHARGE SURFACE TREATMENT AND METHOD OF MANUFACTURING THE SAME

TECHNICAL FIELD

The present invention relates to an electrode for electrical-discharge surface treatment that is used in an electrical-discharge surface treatment for forming a film composed of electrode material or material obtained from a reaction of the electrode material to electrical-discharge energy on the surface of a workpiece to be treated by using pulsed electrical-discharge energy obtained by generating a pulsed electrical discharge between a conductive electrode and the workpiece and a method of manufacturing the electrode for electrical-discharge surface treatment.

BACKGROUND ART

In the conventional process of manufacturing a low electrical-resistance compact by the extrusion molding of metal powder, the metal powder and organic binding agent are mixed, kneaded, and extrusion-molded, and then, a sintering is performed on the obtained product to decompose and remove the organic binding agent and to perform a diffusion bonding of the metal powder. For example, in the method of manufacturing a sintering-material for cladding by welding, a powder composed of metal or alloy is mixed with organic binding agent or inorganic binding agent, the mixed material is molded by the extrusion, and then the obtained product is sintered (see, for example, Patent Literature 1).

In the case of manufacturing an electrode for electrical-discharge surface treatment by using the conventional extrusion molding method as described above, a diffusion bonding of particles is necessary to attempt to achieve low electrical resistance of the electrode for electrical-discharge surface treatment.

Patent Literature 1: Japanese Patent Application Laid-open No. 2000-153392

DISCLOSURE OF INVENTION

Problem to be Solved by the Invention

However, in the conventional technology as described above, there is a problem that the manufacturing cost is increased due to the sintering process. In addition, in the conventional technology as described above, there is another problem that a crack is formed in the sintered product (compact).

The present invention has been achieved in consideration of the above-described facts, and it is an object of the present invention to achieve an electrode for electrical-discharge surface treatment and a method of manufacturing the electrode for electrical-discharge surface treatment, which can provide a high-quality electrode for electrical-discharge surface treatment at low cost.

Means for Solving Problem

To solve the above problems and to achieve the object, a method of manufacturing an electrode for electrical-discharge surface treatment according to the present invention includes a kneading process of fabricating a slurry by kneading a first electrode material composed of at least one of metal powder and insulating powder and a second electrode material composed of conductive organic bonding agent in which a conductive resin is dissolved or dispersed in a solvent; a molding process of forming a compact by molding the slurry; and a desiccating process of desiccating the compact at a temperature below a thermal decomposition initiating temperature at which a thermal decomposition of the conductive organic bonding agent starts.

Effect of the Invention

With a method of manufacturing the electrode for electrical-discharge surface treatment according to the present invention, there is an effect that a low electrical-resistance electrode for electrical-discharge surface treatment can be manufactured at low cost without performing a sintering process by using a conductive organic bonding agent as the bonding agent, and a high-quality electrode for electrical-discharge surface treatment can be manufactured, which does not have a crack caused by the sintering.

BRIEF DESCRIPTION OF DRAWINGS

FIG. 3-1 is a graph showing a relation between a weight percentage of a solvent included in a slurry when manufacturing an electrode for electrical-discharge surface treatment and a specific resistance of the electrode for electrical-discharge surface treatment.

FIG. 3-2 is a table showing numerical data of a measurement result shown in FIG. 3-1.

FIG. 6-1 is a graph showing a voltage waveform applied between an electrode and a workpiece at the time of the electrical discharge, which is an example of a pulse condition at the time of electrical-discharge surface treatment.

FIG. 6-2 is a graph showing a current waveform flowing at the time of the electrical discharge, which is an example of a pulse condition at the time of electrical-discharge surface treatment.

FIG. 7-1 is a table showing a manufacturing conditions and specific resistances of electrodes for electrical-discharge surface treatment of embodiment examples and comparison examples according to a second embodiment.

FIG. 7-2 is a table showing a manufacturing conditions and specific resistances of electrodes for electrical-discharge surface treatment of embodiment examples and comparison examples according to the second embodiment.

FIG. 8-1 is a table showing a manufacturing conditions and specific resistances of electrodes for electrical-discharge surface treatment of embodiment examples and comparison examples according to a third embodiment.

FIG. 8-2 is a table showing a manufacturing conditions and specific resistances of electrodes for electrical-discharge surface treatment of embodiment examples and comparison examples according to the third embodiment.

FIG. 8-3 is a table showing a manufacturing conditions and specific resistances of electrodes for electrical-discharge surface treatment of embodiment examples and comparison examples according to the third embodiment.

FIG. 12 is a table showing numerical data of a measurement result shown in FIG. 11.

EXPLANATIONS OF LETTERS OR NUMERALS

Figure 1:
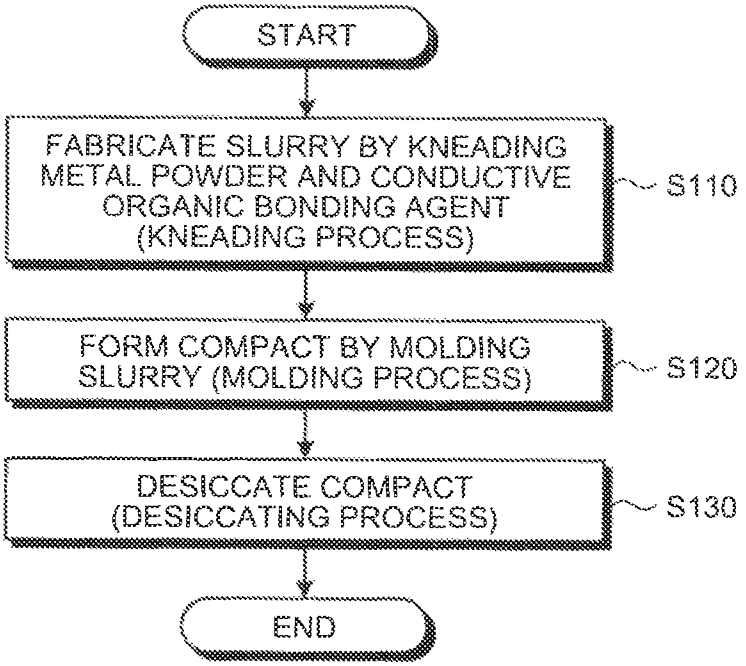
FIG. 1 is a flowchart for explaining an outline of a processing procedure in a method of manufacturing an electrode for electrical-discharge surface treatment according to the present invention.

1 kneading/extrusion-molding device
11 outer vessel
12 screw
13 inlet
16 outlet
17 slurry
21 conductive organic bonding agent
22 stellite powder
23 void
301 electrode
302 workpiece
303 machining fluid
304 power supply for electrical-discharge surface treatment
305 arc column

BEST MODE(S) FOR CARRYING OUT THE INVENTION

Exemplary embodiments of an electrode for electrical-discharge surface treatment according to the present invention are explained in detail below with reference to the attached drawings. It is noted that the present invention is not limited by the following description, and, therefore, any modification is possible without departing the scope of the present invention.

First Embodiment

An outline of a method of manufacturing an electrode for electrical-discharge surface treatment according to the present invention will be explained first. FIG. 1 is a flowchart for explaining an outline of a processing procedure in a method of manufacturing an electrode for electrical-discharge surface treatment according to the present invention. As shown in FIG. 1, the method of manufacturing an electrode for electrical-discharge surface treatment according to the present invention includes a kneading process of fabricating a kneaded material (slurry) by kneading a first electrode material composed of at least one of metal powder and insulating powder and a second electrode material composed of conductive organic bonding agent (Step S110), a molding process of forming a compact by molding the kneaded material (slurry) (Step S120), and a desiccating process of desiccating the compact at a temperature below the thermal decomposition initiating temperature at which the thermal decomposition of the conductive organic bonding agent starts (Step S130). According to the present invention, with the help of the above processes, it is possible to provide a high-quality electrode for electrical-discharge surface treatment without having a crack. In what follows, a method of manufacturing an electrode for electrical-discharge surface treatment according to a first embodiment will be explained with reference to FIG. 1. A detailed explanation will be given for each of the processes in the method of manufacturing an electrode for electrical-discharge surface.

(Kneading Process)

In the kneading process, the kneaded material (slurry) is fabricated by kneading at least one of the metal powder and the insulating powder and the conductive organic bonding agent in which a conductive resin is dissolved or dispersed in a solvent (Step S110).

Figure 2:
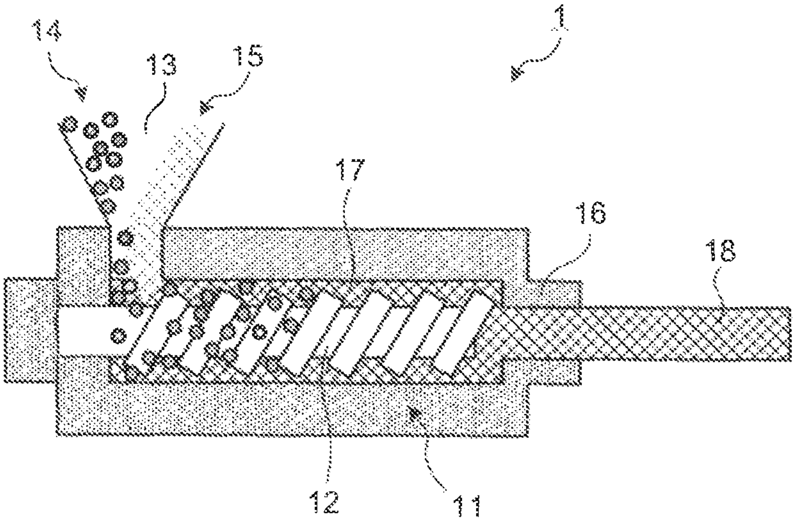
FIG. 2 is a cross-sectional view of a kneading/extrusion-molding device that is used in a method of manufacturing an electrode for electrical-discharge surface treatment according to a first embodiment for explaining a schematic configuration of the kneading/extrusion-molding device.

FIG. 2 is a cross-sectional view of a kneading/extrusion-molding device 1 that is used in a method of manufacturing an electrode for electrical-discharge surface treatment according to a first embodiment for explaining a schematic configuration of the kneading/extrusion-molding device 1. The kneading/extrusion-molding device 1 is configured with a cylindrical outer vessel 11 and a screw 12 that rotates in contact with the outer vessel 11. A groove is formed on the screw 12 in a spiral manner.

In the kneading/extrusion-molding device 1, a first electrode material composed of at least one of the metal powder and the insulating powder and a second electrode material composed of the conductive organic bonding agent which is the conductive resin dissolved or dispersed in the solvent are fed from an inlet 13. When the screw 12 rotates, these materials are sent in the extrusion direction (the direction toward an outlet 16) by passing the spiral groove of the screw 12. With this mechanism, the first electrode material and the second electrode material are uniformly mixed and kneaded, and a slurry 17 is fabricated.

The slurry 17 is sent in the extrusion direction (the direction toward the outlet 16) with the rotation of the screw 12, and is extruded from the outlet 16. With this mechanism, the slurry 17 is fabricated, and a compact (preform) 18 is formed which has a rectangular cross-sectional shape of 11 mm×5 mm.

In the first embodiment, a stellite powder of a phosphorus flake having an average particle diameter equal to or smaller than 3 μm is used as the first electrode material and urethane-containing polythiophen is used as a liquid-state conductive organic bonding agent for the second electrode material, and these materials are fed into the kneading/extrusion-molding device 1 shown in FIG. 2. The ratio of the first electrode material and the second electrode material is set such that the volume of the conductive resin in the second electrode material has a volume ratio equal to or larger than 5% with respect to the volume of the first electrode material. However, it is preferable that the volume of the conductive resin in the second electrode material have a volume ratio equal to or 20% with respect to the volume of the first electrode material. Because, if the conductivity of the first electrode material is low, the conductive resin mainly takes the role of the electrical path, a larger volume ratio of the conductive resin is more preferable. Although the conductive organic bonding agent used here is a bonding agent in which the conductive resin is dissolved or dispersed in a solvent, there is also a case in which a nonconductive resin other than the conductive resin is dissolved or dispersed in the solvent.

After feeding the materials, the screw 12 in the kneading/extrusion-molding device 1 is rotated to sufficiently knead the materials, and finally the slurry 17 is fabricated.

(Molding Process)

In the molding process, a compact is formed by molding the slurry fabricated at the kneading process (Step S120). In the first embodiment, following the fabrication of the slurry 17 in the kneading/extrusion-molding device 1, a formation of the compact is performed by molding the slurry. Furthermore, in the first embodiment, by vacuuming the inside of the kneading/extrusion-molding device 1, the compact (preform) of 100 mm×11 mm×5 mm is obtained by extrusion molding the slurry 17 at an extrusion pressure of 10 MPa to 100 MPa while controlling the solvent amount (wt %) contained in the slurry 17 to various amounts.

(Desiccating Process)

In the desiccating process, the compact is desiccated at a temperature below the thermal decomposition initiating temperature at which the thermal decomposition of the conductive organic bonding agent contained in the compact starts (Step S130). In the first embodiment, an electrode for electrical-discharge surface treatment is obtained by desiccating and curing the compact (preform) 18 obtained at the molding process at a temperature of 140° C., which is a temperature below the thermal decomposition initiating temperature at which the thermal decomposition of the polythiophen starts, in a vacuum atmosphere. The desiccating time is two hours to four hours.

Figures 1, 3:
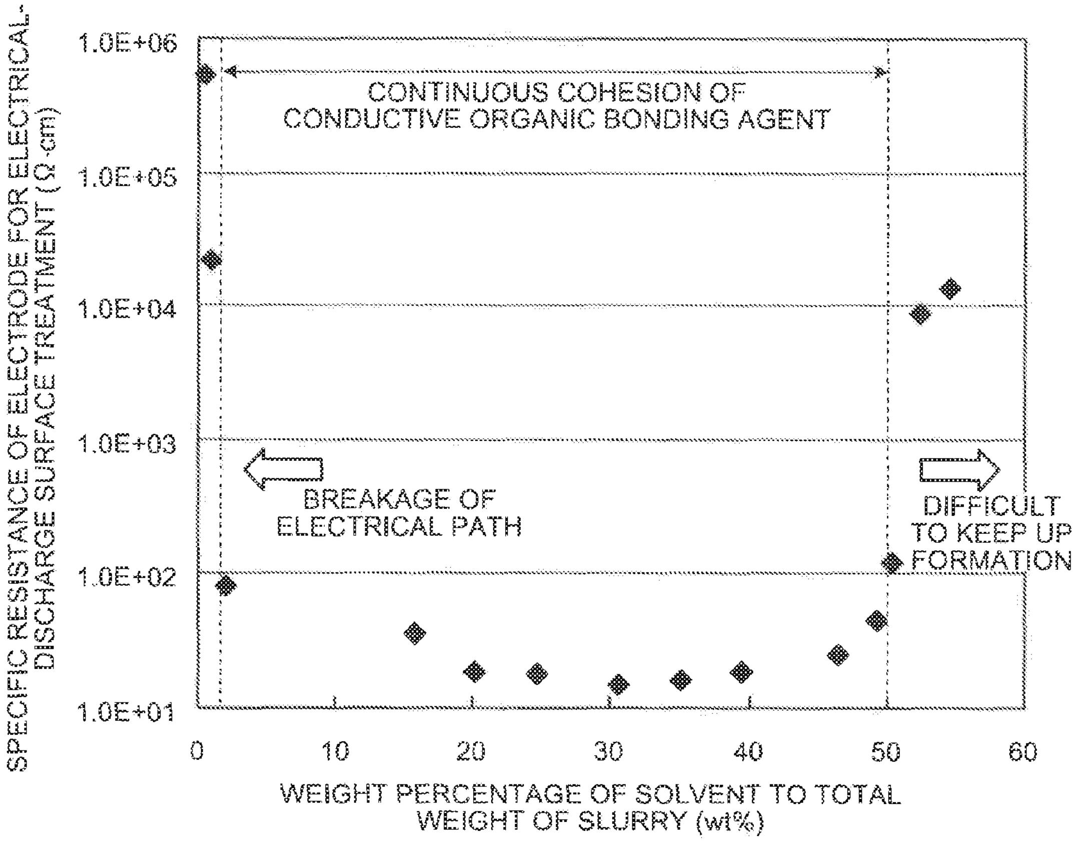

Subsequently, the specific resistance characteristic of the electrode for electrical-discharge surface treatment obtained as described above is studied. FIG. 3-1 is a graph showing a relation between a weight percentage (wt %) of a solvent included in the slurry 17 when manufacturing the electrode for electrical-discharge surface treatment and the specific resistance (Ω·cm) of the finally obtained electrode for electrical-discharge surface treatment. FIG. 3-2 is a table showing numerical data of a measurement result shown in FIG. 3-1. The measurement of the specific resistance is performed by the four probe method.

From FIGS. 3-1 and 3-2, it turns out that an electrode for electrical-discharge surface treatment having a low electrical resistance equal to or lower than about $1.0\times10^2$ (Ω·cm) can be obtained when the weight percentage of the solvent amount contained in the slurry 17 is 2 wt % to 50 wt %. It is considered that this result is obtained because a good electrical path is formed by the conductive organic bonding agent in the electrode for electrical-discharge surface treatment by using the conductive organic bonding agent as the bonding agent.

Therefore, with the method of manufacturing the electrode for electrical-discharge surface treatment according to the present embodiment, an electrode for electrical-discharge surface treatment having a low electrical resistance can be obtained without performing a diffusion bonding of particles by the sintering, by using the conductive organic bonding agent as the bonding agent for the electrode for electrical-discharge surface treatment. Furthermore, because the sintering is not performed in the process of manufacturing the electrode for electrical-discharge surface treatment, there is no increase in the manufacturing cost due to an execution of the sintering, and as a result, an electrode for electrical-discharge surface treatment having a low electrical resistance can be obtained at low cost. In addition, because the sintering is not performed in the process of manufacturing the electrode for electrical-discharge surface treatment, a high-quality electrode for electrical-discharge surface treatment can be obtained without having a crack of the electrode for electrical-discharge surface treatment due to the sintering.

Furthermore, from FIGS. 3-1 and 3-2, it turns out that the specific resistance of the electrode for electrical-discharge surface treatment is decreased by equal to or more than two digits (decreased to equal to or less than 1/100) compared to the case in which the weight percentage of the solvent amount contained in the slurry 17 is smaller than 2 wt % and larger than 50 wt %, and an electrode for electrical-discharge surface treatment having a low electrical resistance can be obtained when the weight percentage of the solvent amount contained in the slurry 17 is 2 wt % to 50 wt %.

As the solvent amount contained in the slurry 17 decreases, the electrical path of the conductive organic bonding agent in the electrode for electrical-discharge surface treatment becomes broken, so that it is considered that the specific resistance of the whole electrode for electrical-discharge surface treatment increases. This tendency becomes much more pronounced especially when the weight percentage of the solvent amount contained in the slurry 17 is smaller than 2 wt %.

On the other hand, as the solvent amount contained in the slurry 17 increases, it becomes hard to keep the formation of the compact (preform) 18 after the extrusion molding because of the solvent. Furthermore, as the solvent amount contained in the slurry 17 increases, the shrinkage of the compact (preform) 18 increases at the time of desiccating the compact (preform) 18, which makes it hard to keep the formation of the compact. This tendency becomes much more pronounced especially when the weight percentage of the solvent amount contained in the slurry 17 is smaller than 2 wt % or larger than 50 wt %.

Therefore, from the above facts, it turns out that a control of the solvent amount contained in the slurry 17 is important at the time of the extrusion molding to keep the electrical connection of the conductive organic bonding agent in the electrode for electrical-discharge surface treatment and the formation of the electrode for electrical-discharge surface treatment. In other words, in order to obtain an electrode for electrical-discharge surface treatment having a low electrical resistance and a good formation, it is important to control the solvent amount contained in the slurry 17 at the time of the extrusion molding.

In the present invention, therefore, in order to obtain an electrode for electrical-discharge surface treatment having a low electrical resistance and a good formation, it is preferable to set the percentage of the solvent amount contained in the slurry 17 to 2 wt % to 50 wt %. By setting the percentage of the solvent amount contained in the slurry 17 to 2 wt % to 50 wt %, it is possible to suppress an excessive breakage of the electrical path of the conductive organic bonding agent in the electrode for electrical-discharge surface treatment, and to obtain an electrode for electrical-discharge surface treatment having a low electrical resistance. Furthermore, by setting the percentage of the solvent amount contained in the slurry 17 to 2 wt % to 50 wt %, it is possible to prevent the formation of the electrode for electrical-discharge surface treatment from being out of shape due to the solvent, and to obtain an electrode for electrical-discharge surface treatment having a good formation. Therefore, by setting the percentage of the solvent amount contained in the slurry 17 to 2 wt % to 50 wt %, a high-quality electrode for electrical-discharge surface treatment having a low electrical resistance and a good formation can be obtained more definitely.

Figure 4:
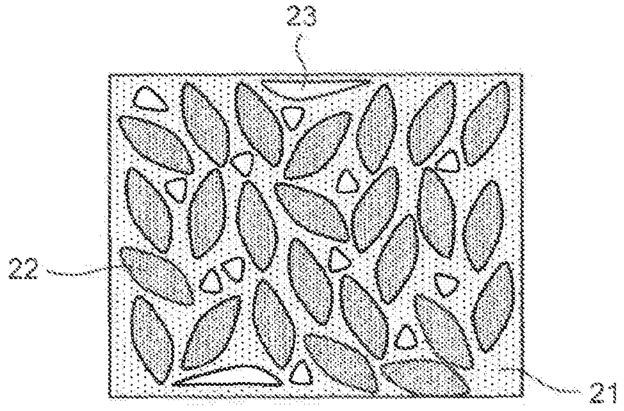
FIG. 4 is a schematic diagram of a scanning electron microscope image of an internal structure of the electrode for electrical-discharge surface treatment according to the first embodiment.

FIG. 4 is a schematic diagram of a scanning electron microscope image of an internal structure of the electrode for electrical-discharge surface treatment according to the first embodiment. The electrode for electrical-discharge surface treatment according to the present embodiment is formed with the first electrode material composed of at least one of metal powder and insulating powder dispersed in a second electrode material composed of conductive organic bonding agent containing the conductive resin.

As shown in FIG. 4, in the electrode for electrical-discharge surface treatment according to the present embodiment, because a conductive organic bonding agent 21 is tightly filled to surround a stellite powder 22, the electrical path of the conductive organic bonding agent 21 is connected without a break, and therefore, an electrode for electrical-discharge surface treatment having a low electrical resistance can be obtained.

Furthermore, by setting the percentage of the solvent amount contained in the slurry 17 to 2 wt % to 50 wt %, a structural strength as a compact as well as the low electrical resistance can be secured, which makes it possible to keep a good formation. Therefore, with this electrode for electrical-discharge surface treatment, it is possible to obtain a high-quality electrode for electrical-discharge surface treatment having a low electrical resistance without performing a sintering in the manufacturing process and with a good formation kept therein. In the electrode for electrical-discharge surface treatment according to the present invention, a void 23 is generated due to a shrinkage of the resin at the time of desiccating.

Although a case of manufacturing the electrode for electrical-discharge surface treatment using the stellite powder as the powder material that becomes a coating at the time of an electrical-discharge surface treatment in the above description, nothing in the above description shall be construed to limit the present invention. In other words, in the present invention, at least one of metal powder and insulating powder can be used as the powder material that becomes a coating at the time of an electrical-discharge surface treatment, as well as the stellite powder. The metal powder includes, for example, a pure metal powder or an alloy powder of a cobalt (Co) system, a nickel (Ni) system, an iron (Fe) system, an aluminum (Al) system, a copper (Cu) system, and a zinc (Zn) system. The insulating powder includes, for example, a ceramic powder.

An electrical-discharge surface treatment using the electrode for electrical-discharge surface treatment according to the present embodiment will be explained below. The electrical-discharge surface treatment using the electrode for electrical-discharge surface treatment according to the present embodiment is an electrical-discharge surface treatment for forming a film composed of electrode material or material obtained from a reaction of the electrode material to electrical-discharge energy on the surface of a workpiece to be treated by using pulsed electrical-discharge energy obtained by generating a pulsed electrical discharge between a conductive electrode and the workpiece.

Figure 5:
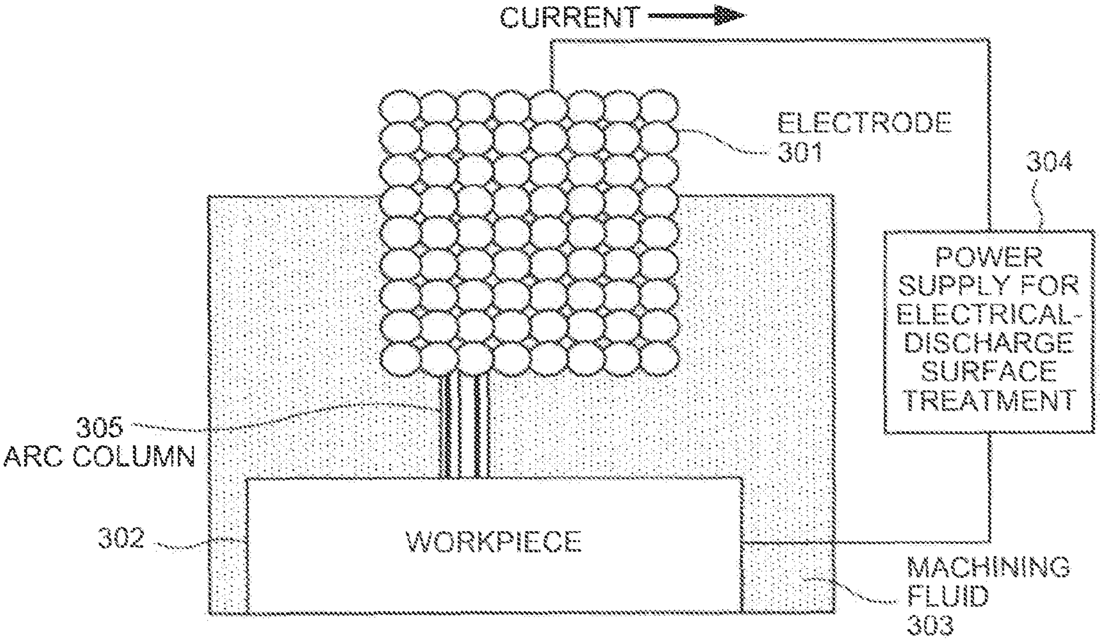
FIG. 5 is a diagram showing a schematic configuration of an electrical-discharge surface treatment device.

FIG. 5 is a diagram showing a schematic configuration of an electrical-discharge surface treatment device. As shown in FIG. 5, the electrical-discharge surface treatment device includes an electrode 301 that is manufactured by the above-described manufacturing method, an oil that is a machining fluid 303, a machining-fluid supply device (not shown) that dips the electrode 301 and a workpiece 302 in the machining fluid or that supplies the machining fluid 303 between the electrode 301 and the workpiece 302, and a power supply for electrical-discharge surface treatment 304 that applies a voltage between the electrode 301 and the workpiece 302 to generate a pulsed electrical discharge (an arc column 305). In FIG. 5, units or members that are not directly related to the present invention are omitted, such as a driving unit that controls a relative position between the power supply for electrical-discharge surface treatment 304 and the workpiece 302.

To form a film on the surface of the workpiece by performing an electrical-discharge surface treatment using the electrical-discharge surface treatment device, the electrode 301 and the workpiece 302 are arranged to face each other in the machining fluid 303, and a pulsed electrical discharge is generated in the machining fluid 303 between the electrode 301 and the workpiece 302 by the power supply for electrical-discharge surface treatment 304. Then, a film composed of the electrode material is formed on the surface of the workpiece by the electrical-discharge energy of the pulsed electrical discharge, or a film composed of material obtained from a reaction of the electrode material to the electrical-discharge energy is formed on the surface of the workpiece by the electrical-discharge energy. The electrode 301 has a negative polarity, and the workpiece 302 has a positive polarity. As shown in FIG. 5, the arc column 305 of the electrical discharge is generated between the electrode 301 and the workpiece 302.

Figures 1, 6:
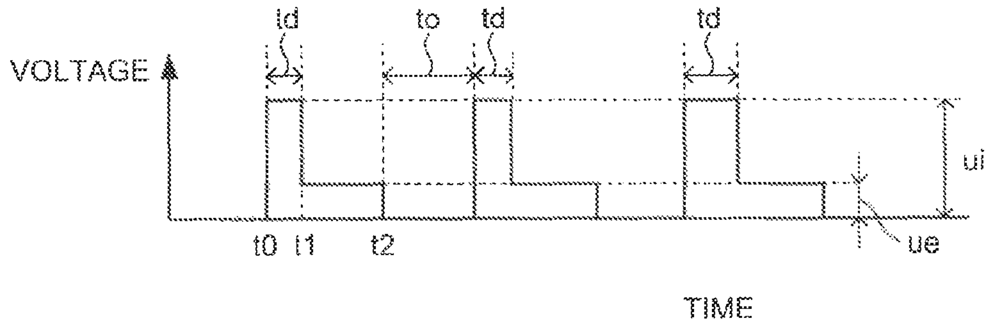
Figures 2, 6:
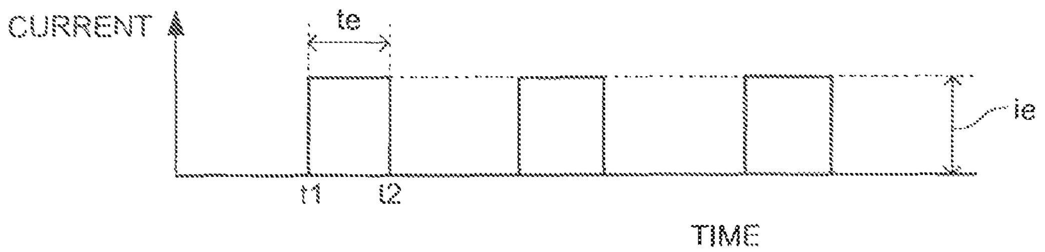

The electrical-discharge surface treatment is performed by using the electrode for electrical-discharge surface treatment according to the present embodiment, to form a film on a workpiece. An example of a pulse condition for the electrical discharge at the time of performing the electrical-discharge surface treatment is shown in FIGS. 6-1 and 6-2. FIGS. 6-1 and 6-2 are graphs showing the pulse condition for the electrical discharge at the time of performing the electrical-discharge surface treatment, where FIG. 6-1 shows a voltage waveform applied between the electrode and the workpiece at the time of the electrical discharge, and FIG. 6-2 shows a current waveform flowing at the time of the electrical discharge.

As shown in FIG. 6-1, a no-load voltage ui is applied between both electrodes at a time t0, and a current starts flowing between the electrodes at a time t1 after a discharge delay time td is elapsed, and then the electrical discharge starts. The voltage at this time is a discharge voltage ue and the current flowing at this time is a peak current ie. When the supply of the voltage between the electrodes is stopped at a time t2, the flow of the current stops.

A time t2-t1 is a pulse width te. The voltage waveform during the time t0 to t2 is repeatedly applied to the electrodes with a pause time to. In other words, as shown in FIG. 6-1, a pulsed voltage is applied between the electrical-discharge surface treatment and the workpiece.

As describe above, with the electrode for electrical-discharge surface treatment according to the present embodiment, by using a conductive organic bonding agent as the bonding agent, the conductive organic bonding agent is tightly filled to surround the stellite powder, so that the electrical path of the conductive organic bonding agent is formed without a break. Therefore, an electrode for electrical-discharge surface treatment having a low electrical resistance is realized without performing a sintering in the manufacturing process.

Furthermore, by setting the percentage of the solvent amount contained in the slurry 17 to 2 wt % to 50 wt %, an increase of the specific resistance due to a breakage of the electrical path of the conductive organic bonding agent and an occurrence of a collapse of the formation of the compact (the electrode for electrical-discharge surface treatment) due to the excessive amount of solvent or a collapse of the compact (the electrode for electrical-discharge surface treatment) due to a large shrinkage at the time of desiccating can be prevented. Therefore, an electrode for electrical-discharge surface treatment is realized in which a structural strength as a compact as well as a low electrical resistance can be secured, and a good formation is kept.

In other words, with the electrode for electrical-discharge surface treatment according to the present embodiment, a high-quality electrode for electrical-discharge surface treatment having a low electrical resistance without performing a sintering in the manufacturing process and with a good formation kept is realized. In addition, because the sintering is not performed in the manufacturing process, there is no increase in cost caused by performing the sintering, and therefore, an electrode for electrical-discharge surface treatment having a low electrical resistance is realized at low cost. Moreover, because the sintering is not performed in the manufacturing process, a high-quality electrode for electrical-discharge surface treatment without having a crack of the electrode for electrical-discharge surface treatment due to the sintering is realized.

Furthermore, with the electrode for electrical-discharge surface treatment according to the present embodiment, by using the conductive organic bonding agent as the bonding agent, the conductive organic bonding agent is tightly filled to surround the stellite powder, so that the electrical path of the conductive organic bonding agent is formed without a break. Therefore, an electrode for electrical-discharge surface treatment having a low electrical resistance can be manufactured without performing a sintering in the manufacturing process.

Moreover, by setting the percentage of the solvent amount contained in the slurry 17 to 2 wt % to 50 wt %, an increase of the specific resistance due to a breakage of the electrical path of the conductive organic bonding agent and an occurrence of a collapse of the formation of the compact (the electrode for electrical-discharge surface treatment) due to the excessive amount of solvent or a collapse of the compact (the electrode for electrical-discharge surface treatment) due to a large shrinkage at the time of desiccating can be prevented. Therefore, an electrode for electrical-discharge surface treatment can be manufactured in which a structural strength as a compact as well as a low electrical resistance can be secured and a good formation is kept.

In addition, because the sintering is not performed in the manufacturing process, there is no increase in cost caused by performing the sintering, and therefore, an electrode for electrical-discharge surface treatment having a low electrical resistance can be obtained at low cost. Moreover, because the sintering is not performed in the manufacturing process, a high-quality electrode for electrical-discharge surface treatment without having a crack of the electrode for electrical-discharge surface treatment due to the sintering can be obtained.

In other words, with the electrode for electrical-discharge surface treatment according to the present embodiment, a high-quality electrode for electrical-discharge surface treatment having a low electrical resistance without performing a sintering in the manufacturing process and with a good formation kept can be manufactured. In addition, because the sintering is not performed in the manufacturing process, an electrode for electrical-discharge surface treatment having a low electrical resistance can be manufactured at low cost. Moreover, because the sintering is not performed in the manufacturing process, a high-quality electrode for electrical-discharge surface treatment without having a crack of the electrode for electrical-discharge surface treatment due to the sintering can be manufactured.

Second Embodiment

In the first embodiment, a case of using polythiophen as the conductive organic bonding agent is explained, however, the conductive organic bonding agent that can be used in the present invention is not limited to polythiophen. In a second embodiment, a case of manufacturing an electrode for electrical-discharge surface treatment by the same method as that of the first embodiment using polyaniline or polypyrrole will be explained.

In embodiment examples 2-1 to 2-3, electrodes for electrical-discharge surface treatment are manufactured in the same manner as the case of the first embodiment by using a stellite powder of a phosphorus flake having an average particle diameter equal to or smaller than 3 μm as the first electrode material, using polyaniline as the conductive organic bonding agent for the second electrode material, and setting the weight percentage of the solvent amount contained in the slurry to 2 wt % (the embodiment example 2-1), 30 wt % (the embodiment example 2-2), and 50 wt % (the embodiment example 2-3), respectively.

Meanwhile, in comparison examples 2-1 and 2-2, electrodes for electrical-discharge surface treatment is manufactured in the same manner as the case of the first embodiment by using a stellite powder of a phosphorus flake having an average particle diameter equal to or smaller than 3 μm as the first electrode material, using polyaniline as the conductive organic bonding agent for the second electrode material, and setting the weight percentage of the solvent amount contained in the slurry to 0.5 wt % (the comparison example 2-1) and 30 wt % (the comparison example 2-2), respectively.

Then, a measurement is performed to measure the specific resistance of the electrodes for electrical-discharge surface treatment according to the embodiment examples 2-1 to 2-3 and the comparison examples 2-1 and 2-2 manufactured under the above conditions. The measurement of the specific resistance is performed by the four probe method. A result of the measurement is shown in FIG. 7-1.

Furthermore, in embodiment examples 2-4 to 2-6, electrodes for electrical-discharge surface treatment is manufactured in the same manner as the case of the first embodiment by using a stellite powder of a phosphorus flake having an average particle diameter equal to or smaller than 3 μm as the first electrode material, using polypyrrole as the conductive organic bonding agent for the second electrode material, and setting the weight percentage of the solvent amount contained in the slurry to 2 wt % (the embodiment example 2-4), 30 wt % (the embodiment example 2-5), and 50 wt % (the embodiment example 2-6), respectively.

Meanwhile, in comparison examples 2-3 and 2-4, electrodes for electrical-discharge surface treatment is manufactured in the same manner as the case of the first embodiment by using a stellite powder of a phosphorus flake having an average particle diameter equal to or smaller than 3 μm as the first electrode material, using polypyrrole as the conductive organic bonding agent for the second electrode material, and setting the weight percentage of the solvent amount contained in the slurry to 0.5 wt % (the comparison example 2-3) and 30 wt % (the comparison example 2-4), respectively.

Then, a measurement is performed to measure the specific resistance of the electrodes for electrical-discharge surface treatment according to the embodiment examples 2-4 to 2-6 and the comparison examples 2-3 and 2-4 manufactured under the above conditions. The measurement of the specific resistance is performed by the four probe method. A result of the measurement is shown in FIG. 7-2.

From FIG. 7-1, it turns out that the specific resistance of the electrodes for electrical-discharge surface treatment according to the embodiment examples 2-1 to 2-3 is lower than the specific resistance of the electrodes for electrical-discharge surface treatment according to the comparison examples 2-1 and 2-2 by about three to four digits.

It is considered that the reason why the specific resistance of the electrode for electrical-discharge surface treatment according to the comparison example 2-1 is high is because the weight percentage of the solvent amount contained in the slurry is as small as 0.5 wt % in the electrode for electrical-discharge surface treatment according to the comparison example 2-1, so that the electrical path is broken in the electrode for electrical-discharge surface treatment. Furthermore, it is considered that the reason why the specific resistance of the electrode for electrical-discharge surface treatment according to the comparison example 2-2 is high is because the weight percentage of the solvent amount contained in the slurry is as large as 60 wt % in the electrode for electrical-discharge surface treatment according to the comparison example 2-2, so that it is hard to keep the formation of the compact (the electrode for electrical-discharge surface treatment). In the electrodes for electrical-discharge surface treatment according to the embodiment examples 2-1 to 2-3, it is considered that the specific resistance is low compared to the electrodes for electrical-discharge surface treatment according to the comparison examples 2-1 and 2-2 because a condition like the comparison example 2-1 or the comparison example 2-2 does not occur so that a good electrical path is formed.

Furthermore, from FIG. 7-2, it turns out that the specific resistance of the electrodes for electrical-discharge surface treatment according to the embodiment examples 2-4 to 2-6 is lower than the specific resistance of the electrodes for electrical-discharge surface treatment according to the comparison examples 2-3 and 2-4 by about two to three digits.

It is considered that the reason why the specific resistance of the electrode for electrical-discharge surface treatment according to the comparison example 2-3 is high is because the weight percentage of the solvent amount contained in the slurry is as small as 0.5 wt % in the electrode for electrical-discharge surface treatment according to the comparison example 2-3, so that the electrical path is broken in the electrode for electrical-discharge surface treatment. Furthermore, it is considered that the reason why the specific resistance of the electrode for electrical-discharge surface treatment according to the comparison example 2-4 is high is because the weight percentage of the solvent amount contained in the slurry is as large as 60 wt % in the electrode for electrical-discharge surface treatment according to the comparison example 2-4, so that it is hard to keep the formation of the compact (the electrode for electrical-discharge surface treatment). In the electrodes for electrical-discharge surface treatment according to the embodiment examples 2-4 to 2-6, it is considered that the specific resistance is low compared to the electrodes for electrical-discharge surface treatment according to the comparison examples 2-3 and 2-4 because a condition like the comparison example 2-3 or the comparison example 2-4 does not occur so that a good electrical path is formed.

As described above, with the electrode for electrical-discharge surface treatment according to the present embodiment, even when polyaniline or polypyrrole is used for the conductive organic bonding agent as the bonding agent, the connection of the electrical path of the conductive organic bonding agent is formed, and therefore, an electrode for electrical-discharge surface treatment having a low electrical resistance is realized without performing a sintering in the manufacturing process.

Furthermore, by setting the percentage of the solvent amount contained in the slurry 17 to 2 wt % to 50 wt %, an increase of the specific resistance due to a breakage of the electrical path of the conductive organic bonding agent and an occurrence of a collapse of the formation of the compact (the electrode for electrical-discharge surface treatment) due to the excessive amount of solvent or a collapse of the compact (the electrode for electrical-discharge surface treatment) due to a large shrinkage at the time of desiccating can be prevented. Therefore, an electrode for electrical-discharge surface treatment is realized in which a structural strength as a compact as well as a low electrical resistance can be secured, and a good formation is kept.

In other words, with the electrode for electrical-discharge surface treatment according to the present embodiment, even when polyaniline or polypyrrole is used for the conductive organic bonding agent as the bonding agent, a high-quality electrode for electrical-discharge surface treatment having a low electrical resistance without performing a sintering in the manufacturing process and with a good formation kept is realized. In addition, because the sintering is not performed in the manufacturing process, there is no increase in cost caused by performing the sintering, and therefore, an electrode for electrical-discharge surface treatment having a low electrical resistance is realized at low cost. Moreover, because the sintering is not performed in the manufacturing process, a high-quality electrode for electrical-discharge surface treatment without having a crack of the electrode for electrical-discharge surface treatment due to the sintering is realized.

Furthermore, with the electrode for electrical-discharge surface treatment according to the present embodiment, even when polyaniline or polypyrrole is used for the conductive organic bonding agent as the bonding agent, the connection of the electrical path of the conductive organic bonding agent is formed. Therefore, an electrode for electrical-discharge surface treatment having a low electrical resistance can be manufactured without performing a sintering in the manufacturing process.

Furthermore, by setting the percentage of the solvent amount contained in the slurry 17 to 2 wt % to 50 wt %, an increase of the specific resistance due to a breakage of the electrical path of the conductive organic bonding agent and an occurrence of a collapse of the formation of the compact (the electrode for electrical-discharge surface treatment) due to the excessive amount of solvent or a collapse of the compact (the electrode for electrical-discharge surface treatment) due to a large shrinkage at the time of desiccating can be prevented. Therefore, an electrode for electrical-discharge surface treatment can be manufactured in which a structural strength as a compact as well as a low electrical resistance can be secured and a good formation is kept.

In addition, because the sintering is not performed in the manufacturing process, there is no increase in cost caused by performing the sintering, and therefore, an electrode for electrical-discharge surface treatment having a low electrical resistance can be obtained at low cost. Moreover, because the sintering is not performed in the manufacturing process, a high-quality electrode for electrical-discharge surface treatment without having a crack of the electrode for electrical-discharge surface treatment due to the sintering can be obtained.

In other words, with the electrode for electrical-discharge surface treatment according to the present embodiment, even when polyaniline or polypyrrole is used for the conductive organic bonding agent as the bonding agent, a high-quality electrode for electrical-discharge surface treatment having a low electrical resistance without performing a sintering in the manufacturing process and with a good formation kept can be manufactured. In addition, because the sintering is not performed in the manufacturing process, an electrode for electrical-discharge surface treatment having a low electrical resistance can be manufactured at low cost. Moreover, because the sintering is not performed in the manufacturing process, a high-quality electrode for electrical-discharge surface treatment without having a crack of the electrode for electrical-discharge surface treatment due to the sintering can be manufactured.

Third Embodiment

In a third embodiment, a case of manufacturing an electrode for electrical-discharge surface treatment by adding a polar solvent to the conductive organic bonding agent that is used in the first and the second embodiments by 1 wt % to 10 wt % with respect to the total weight of the conductive organic bonding agent. As the polar solvent, ethylene glycol, dimethylsulfoxide, and dimethylacetamide are used.

First, in embodiment examples 3-1 to 3-3, a stellite powder of a phosphorus flake having an average particle diameter equal to or smaller than 3 μm is used as the first electrode material, and a substance obtained by adding ethylene glycol as the polar solvent to urethane-containing polythiophen by 1 wt % (the embodiment example 3-1), 5 wt % (the embodiment example 3-2), and 10 wt % (the embodiment example 3-3), respectively, with respect to the total weight of the conductive organic bonding agent is used as the conductive organic bonding agent for the second electrode material. Then, electrodes for electrical-discharge surface treatment are manufactured in the same manner as the case of the first embodiment by setting the weight percentage of the solvent amount contained in the slurry to 20 wt %.

Meanwhile, in a comparison example 3-1, an electrode for electrical-discharge surface treatment is manufactured in the same manner as the cases of the embodiment examples 3-1 to 3-3 except for a condition that ethylene glycol as the polar solvent is not added in the conductive organic bonding agent. Then, a measurement is performed to measure the specific resistance of the electrodes for electrical-discharge surface treatment according to the embodiment examples 3-1 to 3-3 and the comparison example 3-1 manufactured under the above conditions. The measurement of the specific resistance is performed by the four probe method. A result of the measurement is shown in FIG. 8-1.

From FIG. 8-1, it turns out that the specific resistance of the electrodes for electrical-discharge surface treatment according to the embodiment examples 3-1 to 3-3 is lower than the specific resistance of the electrode for electrical-discharge surface treatment according to the comparison example 3-1 by about two to three digits.

In the electrode for electrical-discharge surface treatment according to the embodiment examples 3-1 to 3-3 in which ethylene glycol as the polar solvent is added in the conductive organic bonding agent, the conductivity is enhanced because the sterical orientation of the conductive resin in the conductive organic bonding agent is changed in the direction in which the electrical path is more secured. Therefore, in the electrode for electrical-discharge surface treatment according to the embodiment examples 3-1 to 3-3, it is considered that the specific resistance of the electrode for electrical-discharge surface treatment is decreased compared to the electrode for electrical-discharge surface treatment according to the comparison example 3-1 in which ethylene glycol as the polar solvent is not added in the conductive organic bonding agent.

In embodiment examples 3-4 to 3-6, a stellite powder of a phosphorus flake having an average particle diameter equal to or smaller than 3 μm is used as the first electrode material, and a substance obtained by adding dimethylsulfoxide as the polar solvent to polythiophen by 1 wt % (the embodiment example 3-4), 5 wt % (the embodiment example 3-5), and 10 wt % (the embodiment example 3-6), respectively, with respect to the total weight of the conductive organic bonding agent is used as the conductive organic bonding agent for the second electrode material. Then, electrodes for electrical-discharge surface treatment are manufactured in the same manner as the case of the first embodiment by setting the weight percentage of the solvent amount contained in the slurry to 20 wt %.

Meanwhile, in a comparison example 3-2, an electrode for electrical-discharge surface treatment is manufactured in the same manner as the cases of the embodiment examples 3-4 to 3-6 except for a condition that dimethylsulfoxide as the polar solvent is not added in the conductive organic bonding agent. Then, a measurement is performed to measure the specific resistance of the electrodes for electrical-discharge surface treatment according to the embodiment examples 3-4 to 3-6 and the comparison example 3-2 manufactured under the above conditions. The measurement of the specific resistance is performed by the four probe method. A result of the measurement is shown in FIG. 8-1.

From FIG. 8-1, it turns out that the specific resistance of the electrodes for electrical-discharge surface treatment according to the embodiment examples 3-4 to 3-6 is lower than the specific resistance of the electrode for electrical-discharge surface treatment according to the comparison example 3-2 by two digits.

In the electrode for electrical-discharge surface treatment according to the embodiment examples 3-4 to 3-6 in which dimethylsulfoxide as the polar solvent is added in the conductive organic bonding agent, the conductivity is enhanced because the sterical orientation of the conductive resin in the conductive organic bonding agent is changed in the direction in which the electrical path is more secured. Therefore, in the electrode for electrical-discharge surface treatment according to the embodiment examples 3-4 to 3-6, it is considered that the specific resistance of the electrode for electrical-discharge surface treatment is decreased compared to the electrode for electrical-discharge surface treatment according to the comparison example 3-2 in which dimethylsulfoxide as the polar solvent is not added in the conductive organic bonding agent.

In embodiment examples 3-7 to 3-9, a stellite powder of a phosphorus flake having an average particle diameter equal to or smaller than 3 μm is used as the first electrode material, and a substance obtained by adding dimethylacetamide as the polar solvent to polythiophen by 1 wt % (the embodiment example 3-7), 5 wt % (the embodiment example 3-8), and 10 wt % (the embodiment example 3-9), respectively, with respect to the total weight of the conductive organic bonding agent is used as the conductive organic bonding agent for the second electrode material. Then, electrodes for electrical-discharge surface treatment are manufactured in the same manner as the case of the first embodiment by setting the weight percentage of the solvent amount contained in the slurry to 20 wt %.

Meanwhile, in a comparison example 3-3, an electrode for electrical-discharge surface treatment is manufactured in the same manner as the cases of the embodiment examples 3-7 to 3-9 except for a condition that dimethylacetamide as the polar solvent is not added in the conductive organic bonding agent. Then, a measurement is performed to measure the specific resistance of the electrodes for electrical-discharge surface treatment according to the embodiment examples 3-7 to 3-9 and the comparison example 3-3 manufactured under the above conditions. The measurement of the specific resistance is performed by the four probe method. A result of the measurement is shown in FIG. 8-1.

From FIG. 8-1, it turns out that the specific resistance of the electrodes for electrical-discharge surface treatment according to the embodiment examples 3-7 to 3-9 is lower than the specific resistance of the electrode for electrical-discharge surface treatment according to the comparison example 3-3 by two digits.

In the electrode for electrical-discharge surface treatment according to the embodiment examples 3-7 to 3-9 in which dimethylacetamide as the polar solvent is added in the conductive organic bonding agent, the conductivity is enhanced because the sterical orientation of the conductive resin in the conductive organic bonding agent is changed in the direction in which the electrical path is more secured. Therefore, in the electrode for electrical-discharge surface treatment according to the embodiment examples 3-7 to 3-9, it is considered that the specific resistance of the electrode for electrical-discharge surface treatment is decreased compared to the electrode for electrical-discharge surface treatment according to the comparison example 3-3 in which dimethylacetamide as the polar solvent is not added in the conductive organic bonding agent.

In embodiment examples 3-10 to 3-12, a stellite powder of a phosphorus flake having an average particle diameter equal to or smaller than 3 μm is used as the first electrode material, and a substance obtained by adding ethylene glycol as the polar solvent to polyaniline by 1 wt % (the embodiment example 3-10), 5 wt % (the embodiment example 3-11), and 10 wt % (the embodiment example 3-12), respectively, with respect to the total weight of the conductive organic bonding agent is used as the conductive organic bonding agent for the second electrode material. Then, electrodes for electrical-discharge surface treatment are manufactured in the same manner as the case of the first embodiment by setting the weight percentage of the solvent amount contained in the slurry to 20 wt %.

Meanwhile, in a comparison example 3-4, an electrode for electrical-discharge surface treatment is manufactured in the same manner as the cases of the embodiment examples 3-10 to 3-12 except for a condition that ethylene glycol as the polar solvent is not added in the conductive organic bonding agent. Then, a measurement is performed to measure the specific resistance of the electrodes for electrical-discharge surface treatment according to the embodiment examples 3-10 to 3-12 and the comparison example 3-4 manufactured under the above conditions. The measurement of the specific resistance is performed by the four probe method. A result of the measurement is shown in FIG. 8-2.

From FIG. 8-2, it turns out that the specific resistance of the electrodes for electrical-discharge surface treatment according to the embodiment examples 3-10 to 3-12 is lower than the specific resistance of the electrode for electrical-discharge surface treatment according to the comparison example 3-4 by one digit.

In the electrode for electrical-discharge surface treatment according to the embodiment examples 3-10 to 3-12 in which ethylene glycol as the polar solvent is added in the conductive organic bonding agent, it is confirmed that the conductivity is enhanced due to the addition of the polar solvent. Therefore, in the electrode for electrical-discharge surface treatment according to the embodiment examples 3-10 to 3-12, it is considered that the specific resistance of the electrode for electrical-discharge surface treatment is decreased compared to the electrode for electrical-discharge surface treatment according to the comparison example 3-4 in which ethylene glycol as the polar solvent is not added in the conductive organic bonding agent.

In embodiment examples 3-13 to 3-15, a stellite powder of a phosphorus flake having an average particle diameter equal to or smaller than 3 μm is used as the first electrode material, and a substance obtained by adding dimethylsulfoxide as the polar solvent to polyaniline by 1 wt % (the embodiment example 3-13), 5 wt % (the embodiment example 3-14), and 10 wt % (the embodiment example 3-15), respectively, with respect to the total weight of the conductive organic bonding agent is used as the conductive organic bonding agent for the second electrode material. Then, electrodes for electrical-discharge surface treatment are manufactured in the same manner as the case of the first embodiment by setting the weight percentage of the solvent amount contained in the slurry to 20 wt %.

Meanwhile, in a comparison example 3-5, an electrode for electrical-discharge surface treatment is manufactured in the same manner as the cases of the embodiment examples 3-13 to 3-15 except for a condition that dimethylsulfoxide as the polar solvent is not added in the conductive organic bonding agent. Then, a measurement is performed to measure the specific resistance of the electrodes for electrical-discharge surface treatment according to the embodiment examples 3-13 to 3-15 and the comparison example 3-5 manufactured under the above conditions. The measurement of the specific resistance is performed by the four probe method. A result of the measurement is shown in FIG. 8-2.

From FIG. 8-2, it turns out that the specific resistance of the electrodes for electrical-discharge surface treatment according to the embodiment examples 3-13 to 3-15 is lower than the specific resistance of the electrode for electrical-discharge surface treatment according to the comparison example 3-5 by one digit.

In the electrode for electrical-discharge surface treatment according to the embodiment examples 3-13 to 3-15 in which dimethylsulfoxide as the polar solvent is added in the conductive organic bonding agent, it is confirmed that the conductivity is enhanced due to the addition of the polar solvent. Therefore, in the electrode for electrical-discharge surface treatment according to the embodiment examples 3-13 to 3-15, it is considered that the specific resistance of the electrode for electrical-discharge surface treatment is decreased compared to the electrode for electrical-discharge surface treatment according to the comparison example 3-5 in which dimethylsulfoxide as the polar solvent is not added in the conductive organic bonding agent.

In embodiment examples 3-16 to 3-18, a stellite powder of a phosphorus flake having an average particle diameter equal to or smaller than 3 μm is used as the first electrode material, and a substance obtained by adding dimethylacetamide as the polar solvent to polyaniline by 1 wt % (the embodiment example 3-16), 5 wt % (the embodiment example 3-17), and 10 wt % (the embodiment example 3-18), respectively, with respect to the total weight of the conductive organic bonding agent is used as the conductive organic bonding agent for the second electrode material. Then, electrodes for electrical-discharge surface treatment are manufactured in the same manner as the case of the first embodiment by setting the weight percentage of the solvent amount contained in the slurry to 20 wt %.

Meanwhile, in a comparison example 3-6, an electrode for electrical-discharge surface treatment is manufactured in the same manner as the cases of the embodiment examples 3-16 to 3-18 except for a condition that dimethylacetamide as the polar solvent is not added in the conductive organic bonding agent. Then, a measurement is performed to measure the specific resistance of the electrodes for electrical-discharge surface treatment according to the embodiment examples 3-16 to 3-18 and the comparison example 3-6 manufactured under the above conditions. The measurement of the specific resistance is performed by the four probe method. A result of the measurement is shown in FIG. 8-2.

From FIG. 8-2, it turns out that the specific resistance of the electrodes for electrical-discharge surface treatment according to the embodiment examples 3-16 to 3-18 is lower than the specific resistance of the electrode for electrical-discharge surface treatment according to the comparison example 3-6 by about a quarter to a half times.

In the electrode for electrical-discharge surface treatment according to the embodiment examples 3-16 to 3-18 in which dimethylacetamide as the polar solvent is added in the conductive organic bonding agent, it is confirmed that the conductivity is enhanced due to the addition of the polar agent. Therefore, in the electrode for electrical-discharge surface treatment according to the embodiment examples 3-16 to 3-18, it is considered that the specific resistance of the electrode for electrical-discharge surface treatment is decreased compared to the electrode for electrical-discharge surface treatment according to the comparison example 3-6 in which dimethylacetamide as the polar solvent is not added in the conductive organic bonding agent.

In embodiment examples 3-19 to 3-21, a stellite powder of a phosphorus flake having an average particle diameter equal to or smaller than 3 μm is used as the first electrode material, and a substance obtained by adding ethylene glycol as the polar solvent to polypyrrole by 1 wt % (the embodiment example 3-19), 5 wt % (the embodiment example 3-20), and 10 wt % (the embodiment example 3-21), respectively, with respect to the total weight of the conductive organic bonding agent is used as the conductive organic bonding agent for the second electrode material. Then, electrodes for electrical-discharge surface treatment are manufactured in the same manner as the case of the first embodiment by setting the weight percentage of the solvent amount contained in the slurry to 20 wt %.

Meanwhile, in a comparison example 3-7, an electrode for electrical-discharge surface treatment is manufactured in the same manner as the cases of the embodiment examples 3-19 to 3-21 except for a condition that ethylene glycol as the polar solvent is not added in the conductive organic bonding agent. Then, a measurement is performed to measure the specific resistance of the electrodes for electrical-discharge surface treatment according to the embodiment examples 3-19 to 3-21 and the comparison example 3-7 manufactured under the above conditions. The measurement of the specific resistance is performed by the four probe method. A result of the measurement is shown in FIG. 8-3.

From FIG. 8-3, it turns out that the specific resistance of the electrodes for electrical-discharge surface treatment according to the embodiment examples 3-19 to 3-21 is lower than the specific resistance of the electrode for electrical-discharge surface treatment according to the comparison example 3-7 by about one to two digits.

In the electrode for electrical-discharge surface treatment according to the embodiment examples 3-19 to 3-21 in which ethylene glycol as the polar solvent is added in the conductive organic bonding agent, it is confirmed that the conductivity is enhanced due to the addition of the polar solvent. Therefore, in the electrode for electrical-discharge surface treatment according to the embodiment examples 3-19 to 3-21, it is considered that the specific resistance of the electrode for electrical-discharge surface treatment is decreased compared to the electrode for electrical-discharge surface treatment according to the comparison example 3-7 in which ethylene glycol as the polar solvent is not added in the conductive organic bonding agent.

In embodiment examples 3-22 to 3-24, a stellite powder of a phosphorus flake having an average particle diameter equal to or smaller than 3 μm is used as the first electrode material, and a substance obtained by adding dimethylsulfoxide as the polar solvent to polypyrrole by 1 wt % (the embodiment example 3-22), 5 wt % (the embodiment example 3-23), and 10 wt % (the embodiment example 3-24), respectively, with respect to the total weight of the conductive organic bonding agent is used as the conductive organic bonding agent for the second electrode material. Then, electrodes for electrical-discharge surface treatment are manufactured in the same manner as the case of the first embodiment by setting the weight percentage of the solvent amount contained in the slurry to 20 wt %.

Meanwhile, in a comparison example 3-8, an electrode for electrical-discharge surface treatment is manufactured in the same manner as the cases of the embodiment examples 3-22 to 3-24 except for a condition that dimethylsulfoxide as the polar solvent is not added in the conductive organic bonding agent. Then, a measurement is performed to measure the specific resistance of the electrodes for electrical-discharge surface treatment according to the embodiment examples 3-22 to 3-24 and the comparison example 3-8 manufactured under the above conditions. The measurement of the specific resistance is performed by the four probe method. A result of the measurement is shown in FIG. 8-3.

From FIG. 8-3, it turns out that the specific resistance of the electrodes for electrical-discharge surface treatment according to the embodiment examples 3-22 to 3-24 is lower than the specific resistance of the electrode for electrical-discharge surface treatment according to the comparison example 3-8 by one digit.

In the electrode for electrical-discharge surface treatment according to the embodiment examples 3-22 to 3-24 in which dimethylsulfoxide as the polar solvent is added in the conductive organic bonding agent, it is confirmed that the conductivity is enhanced due to the addition of the polar solvent. Therefore, in the electrode for electrical-discharge surface treatment according to the embodiment examples 3-22 to 3-24, it is considered that the specific resistance of the electrode for electrical-discharge surface treatment is decreased compared to the electrode for electrical-discharge surface treatment according to the comparison example 3-8 in which dimethylsulfoxide as the polar solvent is not added in the conductive organic bonding agent.

In embodiment examples 3-25 to 3-27, a stellite powder of a phosphorus flake having an average particle diameter equal to or smaller than 3 μm is used as the first electrode material, and a substance obtained by adding dimethylacetamide as the polar solvent to polypyrrole by 1 wt % (the embodiment example 3-25), 5 wt % (the embodiment example 3-26), and 10 wt % (the embodiment example 3-27), respectively, with respect to the total weight of the conductive organic bonding agent is used as the conductive organic bonding agent for the second electrode material. Then, electrodes for electrical-discharge surface treatment are manufactured in the same manner as the case of the first embodiment by setting the weight percentage of the solvent amount contained in the slurry to 20 wt %.

Meanwhile, in a comparison example 3-9, an electrode for electrical-discharge surface treatment is manufactured in the same manner as the cases of the embodiment examples 3-25 to 3-27 except for a condition that dimethylacetamide as the polar solvent is not added in the conductive organic bonding agent. Then, a measurement is performed to measure the specific resistance of the electrodes for electrical-discharge surface treatment according to the embodiment examples 3-25 to 3-27 and the comparison example 3-9 manufactured under the above conditions. The measurement of the specific resistance is performed by the four probe method. A result of the measurement is shown in FIG. 8-3.

From FIG. 8-3, it turns out that the specific resistance of the electrodes for electrical-discharge surface treatment according to the embodiment examples 3-25 to 3-27 is lower than the specific resistance of the electrode for electrical-discharge surface treatment according to the comparison example 3-9 by one digit.

In the electrode for electrical-discharge surface treatment according to the embodiment examples 3-25 to 3-27 in which dimethylacetamide as the polar solvent is added in the conductive organic bonding agent, it is confirmed that the conductivity is enhanced due to the addition of the polar agent. Therefore, in the electrode for electrical-discharge surface treatment according to the embodiment examples 3-25 to 3-27, it is considered that the specific resistance of the electrode for electrical-discharge surface treatment is decreased compared to the electrode for electrical-discharge surface treatment according to the comparison example 3-9 in which dimethylacetamide as the polar solvent is not added in the conductive organic bonding agent.

As described above, with the electrode for electrical-discharge surface treatment according to the present embodiment, because the electrode for electrical-discharge surface treatment is manufactured by using a conductive organic bonding agent to which a polar solvent is added, the conductivity is enhanced due to the addition of the polar solvent. Therefore, an electrode for electrical-discharge surface treatment having a low electrical resistance is realized, which is lower than the electrical resistance of the electrode for electrical-discharge surface treatment that is manufactured by using a conductive organic bonding agent to which the polar solvent is not added.

Furthermore, because the sintering is not performed in the manufacturing process, there is no increase in cost caused by performing the sintering, and therefore, an electrode for electrical-discharge surface treatment having a low electrical resistance is realized at low cost. Moreover, because the sintering is not performed in the manufacturing process, a high-quality electrode for electrical-discharge surface treatment without having a crack of the electrode for electrical-discharge surface treatment due to the sintering is realized.

In addition, as described above, with the electrode for electrical-discharge surface treatment according to the present embodiment, because the electrode for electrical-discharge surface treatment is manufactured by using a conductive organic bonding agent to which a polar solvent is added, the conductivity is enhanced due to the addition of the polar solvent. Therefore, an electrode for electrical-discharge surface treatment having a low electrical resistance can be manufactured, which is lower than the electrical resistance of the electrode for electrical-discharge surface treatment that is manufactured by using a conductive organic bonding agent to which the polar solvent is not added.

Fourth Embodiment

In the first to the third embodiments, a case of using a stellite powder of a phosphorus flake as the first electrode material is explained, however, the formation of the first electrode material that can be used in the present invention is not limited to the stellite powder of the phosphorus flake. In a fourth embodiment, a case of using a mixed powder of a stellite powder of a phosphorus flake and a substantially spherical stellite powder as the first electrode material will be explained.

In the present embodiment, a mixed powder of a stellite powder of a phosphorus flake having an average particle diameter equal to or smaller than 3 μm and a substantially spherical stellite powder having an average particle diameter equal to or smaller than 3 μm is used. As the conductive organic bonding agent for the second electrode material, urethane-containing polythiophen is used. Then, an electrode for electrical-discharge surface treatment having a size of 100 mm×11 mm×5 mm is manufactured in the same manner as the case of the first embodiment by setting a mixed ratio of the substantially spherical stellite powder with respect to the total weight of the mixed powder to 0 wt %, 20 wt %, 40 wt %, 60 wt %, 80 wt %, and 100 wt %, and the weight percentage of the solvent amount contained in the slurry to 20 wt %.

Figure 9:
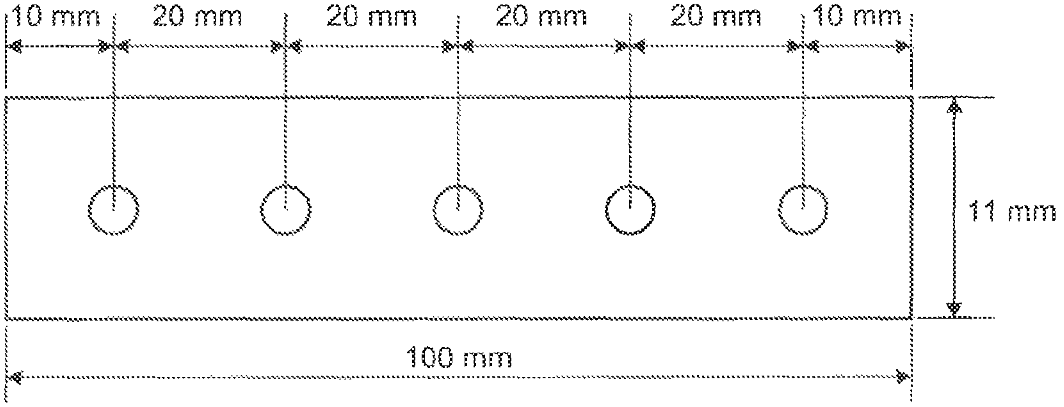
FIG. 9 is a schematic diagram for illustrating a measurement point for measuring a specific resistance in an electrode for electrical-discharge surface treatment according to a fourth embodiment.

Then, a measurement is performed to measure the specific resistance of the electrodes for electrical-discharge surface treatment manufactured under the above conditions to study an influence of the mixed ratio of the substantially spherical stellite powder on the specific resistance of the electrode for electrical-discharge surface treatment. The measurement of the specific resistance is performed by the four probe method with five measurement points at the same interval in the longitudinal direction on the plane of 100 mm×11 mm of the electrode for electrical-discharge surface treatment as shown in FIG. 9. FIG. 9 is a schematic diagram for illustrating the measurement points for measuring the specific resistance in the electrode for electrical-discharge surface treatment. A result of the measurement is shown in FIG. 10.

Figure 10:
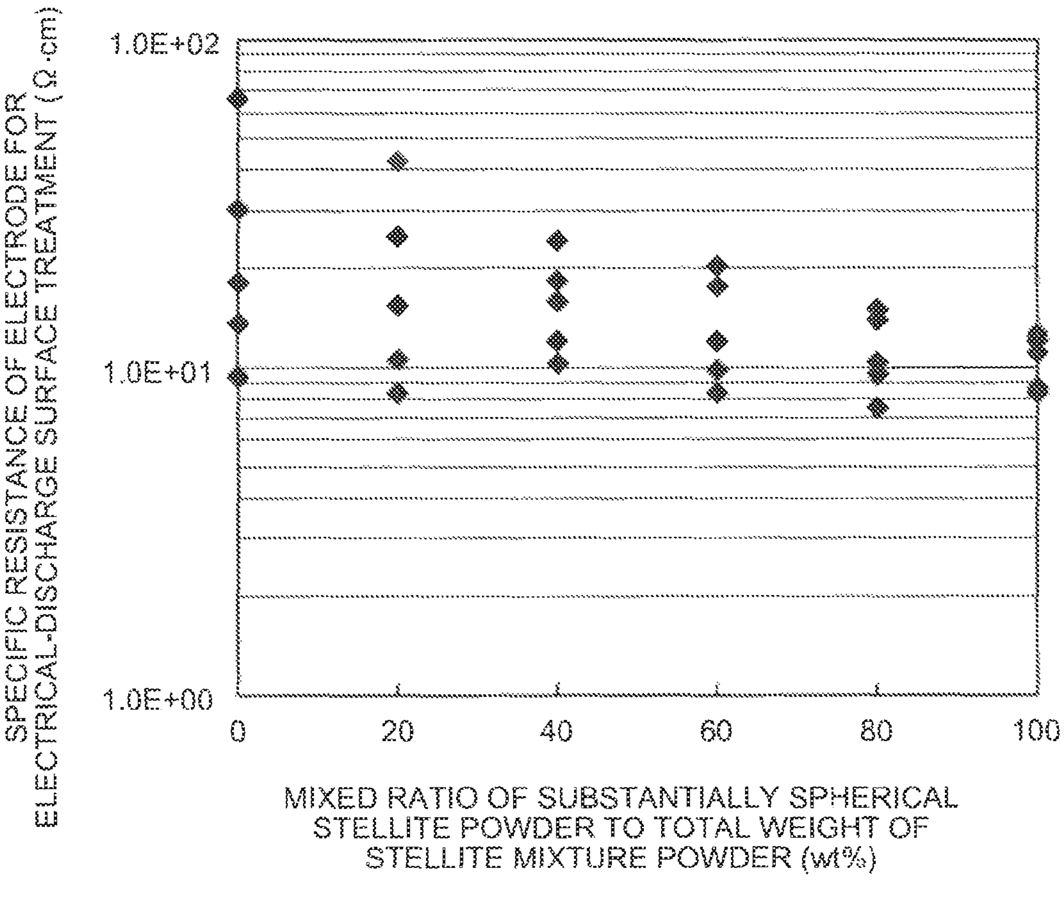
FIG. 10 is a graph showing a relation between a mixed ratio of substantially spherical stellite powder to the total weight of stellite mixture powder and a specific resistance of the electrode for electrical-discharge surface treatment.

From FIG. 10, it turns out that the fluctuation of the specific resistance of the electrode for electrical-discharge surface treatment is decreased as the mixed ratio of the substantially spherical stellite powder in the stellite mixed powder is increased. It is considered that the reason why the fluctuation of the specific resistance of the electrode for electrical-discharge surface treatment is decreased is because the stellite powder is uniformly dispersed in the electrode for electrical-discharge surface treatment with the help of the substantially spherical stellite powder.

As described above, with the electrode for electrical-discharge surface treatment according to the present embodiment, the stellite powder is uniformly dispersed in the electrode for electrical-discharge surface treatment with the help of using a mixed powder of the stellite powder of the phosphorus flake and the substantially spherical stellite powder as the first electrode material, and therefore, a high-quality electrode for electrical-discharge surface treatment is realized in which a local fluctuation of the specific resistance is reduced.

Furthermore, with the electrode for electrical-discharge surface treatment according to the present embodiment, the stellite powder is uniformly dispersed in the electrode for electrical-discharge surface treatment with the help of using a mixed powder of the stellite powder of the phosphorus flake and the substantially spherical stellite powder as the first electrode material, and therefore, a high-quality electrode for electrical-discharge surface treatment can be manufactured in which a local fluctuation of the specific resistance is reduced.

Fifth Embodiment

In a fifth embodiment, a case of manufacturing an electrode for electrical-discharge surface treatment will be explained in which polyvinyl alcohol, which is an organic bonding agent, is added by 1 wt % to 10 wt % with respect to the total weight of the first electrode material in addition to the polythiophen-based conductive organic bonding agent that is a water-based solvent used in the first and the third embodiments. In the present embodiment, a polyvinyl alcohol water solvent having a concentration of 15 wt % is used, where the degree of polymerization of polyvinyl alcohol is 1200.

First, in embodiment examples 5-1 to 5-5, a stellite powder of a phosphorus flake having an average particle diameter equal to or smaller than 3 μm is used as the first electrode material, urethane-containing polythiophen is used as the conductive organic bonding agent for the second electrode material, and polyvinyl alcohol, which is an organic bonding agent, is further added by 1 wt % (the embodiment example 5-1), 3 wt % (the embodiment example 5-2), 5 wt % (the embodiment example 5-3), 7 wt % (the embodiment example 5-4), and 10 wt % (the embodiment example 5-5), respectively, with respect to the total weight of the stellite powder, to fabricate the slurry. Then, electrodes for electrical-discharge surface treatment having a size of 100 mm×11 mm×5 mm are manufactured in the same manner as the case of the first embodiment by setting the weight percentage of the solvent amount contained in the slurry to 20 wt %.

Figure 11:
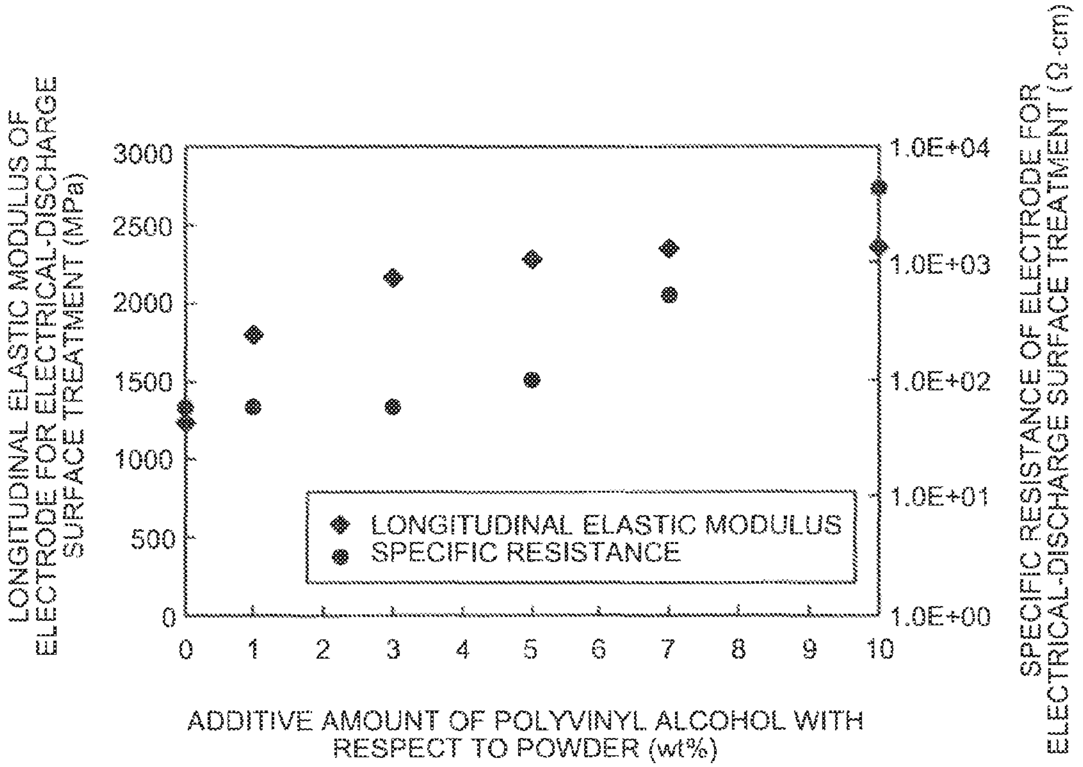
FIG. 11 is a graph showing a relation between an additive amount of polyvinyl alcohol with respect to the powder and a longitudinal elastic modulus and a specific resistance of the electrode for electrical-discharge surface treatment.

Meanwhile, in a comparison example 5-1, an electrode for electrical-discharge surface treatment is manufactured in the same manner as the cases of the embodiment examples 5-1 to 5-5 except for a condition that polyvinyl alcohol, which is an organic bonding agent, is not added in the conductive organic bonding agent. Then, a measurement is performed to measure the longitudinal elastic modulus (MPa) and the specific resistance (Ω·cm) of the electrodes for electrical-discharge surface treatment according to the embodiment examples 5-1 to 5-5 and the comparison example 5-1 manufactured under the above conditions, to study an influence of the addition of polyvinyl alcohol on the strength and the specific resistance of the electrode for electrical-discharge surface treatment. A result of the measurement is shown in FIG. 11. FIG. 11 is a graph showing a relation between an additive amount of polyvinyl alcohol with respect to the powder and the longitudinal elastic modulus and the specific resistance of the electrode for electrical-discharge surface treatment. FIG. 12 is a table showing numerical data of a measurement result shown in FIG. 11.

The measurement of the specific resistance of the electrode for electrical-discharge surface treatment is performed by the four probe method. The measurement of the strength of the electrode for electrical-discharge surface treatment is performed by the three-point bending, where the supports are at two points at 5 mm inside from the both edge, respectively, in the longitudinal direction on the plane of 100 mm×11 mm of the electrode for electrical-discharge surface treatment and the center point. The load speed is set to 0.1 mm/min.

From FIGS. 11 and 12, as for the longitudinal elastic modulus of the electrode for electrical-discharge surface treatment, it turns out that the longitudinal elastic modulus of the electrode for electrical-discharge surface treatment increases with the addition of polyvinyl alcohol by equal to or more than 1 wt % with respect to the weight of the stellite powder, thus the strength of the electrode for electrical-discharge surface treatment increases. Furthermore, it turns out that, as the additive amount of polyvinyl alcohol increases, the longitudinal elastic modulus of the electrode for electrical-discharge surface treatment increases, and the longitudinal elastic modulus tends to be saturated when the additive amount is equal to or more than 3 wt % with respect to the weight of the stellite powder.

In addition, from FIGS. 11 and 12, as for the specific resistance of the electrode for electrical-discharge surface treatment, it turns out that the specific resistance of the electrode for electrical-discharge surface treatment increases in the range where the additive amount of polyvinyl alcohol is more than 5 wt % with respect to the weight of the stellite powder, however, there is virtually no influence of the additive amount of the polyvinyl alcohol in the range from 0 wt % to 5 wt %.

From the above result, it turns out that an electrode for electrical-discharge surface treatment having a high strength can be obtained with an enhancement of the strength of the electrode for electrical-discharge surface treatment by setting the additive amount of polyvinyl alcohol to 1 wt % to 10 wt % with respect to the weight of the stellite powder. Furthermore, it turns out that, by setting the additive amount of polyvinyl alcohol to 1 wt % to 5 wt % with respect to the weight of the stellite powder, an electrode for electrical-discharge surface treatment with an enhanced strength can be obtained without increasing the specific resistance of the electrode for electrical-discharge surface treatment.

As described above, with the electrode for electrical-discharge surface treatment according to the present embodiment, because the electrode for electrical-discharge surface treatment is manufactured by adding polyvinyl alcohol, which is an organic bonding agent, is added by 1 wt % to 10 wt % with respect to the total weight of the first electrode material in addition to the polythiophen-based conductive organic bonding agent that is a water-based solvent, an electrode for electrical-discharge surface treatment having a high strength is realized compared to an electrode for electrical-discharge surface treatment manufactured without adding polyvinyl alcohol. Furthermore, by further limiting the additive amount of polyvinyl alcohol to 1 wt % to 5 wt %, an electrode for electrical-discharge surface treatment having a high strength and with a low electrical resistance kept is realized compared to an electrode for electrical-discharge surface treatment manufactured without adding polyvinyl alcohol.

Although a case of manufacturing the electrode for electrical-discharge surface treatment using the stellite powder as the first electrode material in the above description, nothing in the above description shall be construed to limit the present invention. In other words, in the present invention, at least one of metal powder and insulating powder can be used as the first electrode material that becomes a coating at the time of an electrical-discharge surface treatment, as well as the stellite powder. The metal powder includes, for example, a pure metal powder or an alloy powder of a cobalt (Co) system, a nickel (Ni) system, an iron (Fe) system, an aluminum (Al) system, a copper (Cu) system, and a zinc (Zn) system. The insulating powder includes, for example, a ceramic powder.

In addition, although a case of manufacturing the electrode for electrical-discharge surface treatment using the water-soluble polyvinyl alcohol as the organic bonding agent in the above description, nothing in the above description shall be construed to limit the present invention. In other words, in the present invention, it is possible to use the same organic bonding agent as the dispersion medium of the conductive organic bonding agent according to the type of the dispersion medium of the conductive organic bonding agent. The organic bonding agent includes, for example, polyvinylbutanol that is soluble in alcohol and paraffin that is soluble in benzene.

In addition, in the present invention, a polar solvent can be added at the same time as well as the conductive organic bonding agent when adding the organic bonding agent.

INDUSTRIAL APPLICABILITY

As described above, the method of manufacturing an electrode for electrical-discharge surface treatment is suitable for manufacturing a high-quality electrode for electrical-discharge surface treatment having a low electrical resistance.

The invention claimed is:

1. A method of manufacturing an electrode for electrical-discharge surface treatment, wherein the electrode is used in an electrical-discharge surface treatment for forming a film composed of electrode material or material obtained from a reaction of the electrode material to electrical-discharge energy on the surface of a workpiece to be treated by using pulsed electrical-discharge energy obtained by generating a pulsed electrical discharge between a conductive electrode and the workpiece, the method comprising:

kneading a first electrode material composed of at least one of metal powder and insulating powder and a second electrode material composed of conductive organic bonding agent in which a conductive resin is dissolved or dispersed in a solvent, to fabricate a slurry;

molding the slurry, to form a compact; and desiccating the compact at a temperature below a thermal decomposition initiating temperature at which a thermal decomposition of the conductive organic bonding agent starts.

2. The method according to claim 1, wherein a weight percentage of the solvent with respect to a weight of the slurry is 2 wt % to 50 wt %.

3. The method according to claim 2, wherein the solvent is a polar solvent of 1 wt % to 10 wt % with respect to a total weight of the conductive organic bonding agent.

4. The method according to claim 3, wherein the polar solvent is at least one substance selected from a group consisting of ethylene glycol, dimethylsulfoxide, and dimethylacetamide.

5. The method according to claim 1, wherein a shape of a powder of the first electrode material is substantially spherical.

6. The method according to claim 1, wherein the molding includes forming the compact by extrusion molding the slurry.

7. The method according to claim 1, wherein the kneading includes adding the organic bonding agent of 1 wt % to 10 wt % with respect to a total weight of the first electrode material.

8. The method according to claim 1, wherein a weight percentage of the solvent with respect to a weight of the slurry is 20 wt % to 40 wt %.

9. The method according to claim 1, wherein the kneading includes adding the organic bonding agent of 1 wt % to 5 wt % with respect to a total weight of the first electrode material.

10. An electrode for electrical-discharge surface treatment for forming, on the surface of a workpiece to be treated, a film composed of electrode material or material obtained from a reaction of the electrode material to electrical-discharge energy, by using electrical-discharge energy obtained by generating an electrical discharge between a conductive electrode and the workpiece, the electrode comprising:

a first electrode material composed of at least one of metal powder and insulating powder; and a second electrode material composed of conductive organic bonding agent containing a conductive resin selected from the group consisting of polythiophene, polyaniline, and polypyrrole, wherein the first electrode material is dispersed in the second electrode material, and the volume of the conductive resin has a volume ratio equal to or larger than 5% with respect to the volume of the first electrode material.

11. The electrode according to claim 10, wherein the first electrode material includes a substantially spherical powder.

* * * * *